United States Patent [19]
Nicholson

[11] Patent Number: 5,117,961
[45] Date of Patent: Jun. 2, 1992

[54] CONVEYING APPARATUS AND ARTICLE DIVERTER

[75] Inventor: Robert J. Nicholson, Sheperdsville, Ky.

[73] Assignee: Figgie International Inc., Richmond, Va.

[21] Appl. No.: 645,853

[22] Filed: Jan. 25, 1991

[51] Int. Cl.⁵ .................................. B65G 37/00
[52] U.S. Cl. .................... 198/372; 198/436
[58] Field of Search ............. 198/372, 367, 367.1, 198/457, 809, 597, 598, 436, 369, 861.6

[56] References Cited

U.S. PATENT DOCUMENTS

| | | | |
|---|---|---|---|
| 2,985,274 | 5/1961 | Byrnes et al. | 198/436 X |
| 2,988,196 | 6/1961 | Byrnes et al. | 198/436 X |
| 3,036,691 | 5/1962 | Byrnes et al. | 198/367 X |
| 3,058,565 | 10/1962 | Byrnes | 198/436 X |
| 3,058,567 | 10/1962 | Byrnes et al. | 198/367 X |
| 3,272,298 | 9/1966 | Cato | 198/436 X |
| 3,983,988 | 10/1976 | Maxted et al. | 198/367 X |
| 4,328,889 | 5/1982 | Maxted | 198/367 |
| 4,598,815 | 7/1986 | Adama | 198/372 |
| 4,746,003 | 5/1988 | Yu et al. | 198/372 X |
| 4,792,034 | 12/1988 | Leemkuil | 198/372 |

OTHER PUBLICATIONS

"Selecta-Sort", High Speed Diverter; 3 pg. brochure, A.J. Bayer Company.
"Powered Pivot Diverter", Roach Conveyors, dated Aug. 17, 1988.
"Hytrol Hi-Lites", Oct. 1989.
"Unisort IV", Buschman Conveyors.
"Versa Ferguson", Model LS.
"Ermanco Xeno Sort", Jun. 20, 1986.
"Litten UHS".
"Hytrol—If it moves, we shoot it.".
Modern Materials Handling, May 1989, "Pop-Up Roller Diverter . . . Alvey".

*Primary Examiner*—Robert P. Olszewski
*Assistant Examiner*—Cheryl L. Gastineau
*Attorney, Agent, or Firm*—Wood, Herron & Evans

[57] ABSTRACT

An article diverter is oriented between two belt conveyors and has several pivoted carriages, each mounting two flat powererd diverter belts. A drive belt powers the diverter belts of each carriage from a common drive roller slaved to a power take off from the upstream conveyor, which also drives the next downstream conveyor. The diverter carriages are pivoted by a draw bar, which is selectively reciprocated by a rotary actuator, to divert articles from an initial conveyed direction to or toward another diverging direction at a divert or sort location, diverging conveyor, spur line, orient station or the like. The upstream and downstream conveyors on either side of the diverter can be of different conveyor types, and driven at different speeds. The carriages are vertically and angularly adjustable in incline for tuning the diverter to a wide range of articles and conveying speeds.

37 Claims, 6 Drawing Sheets

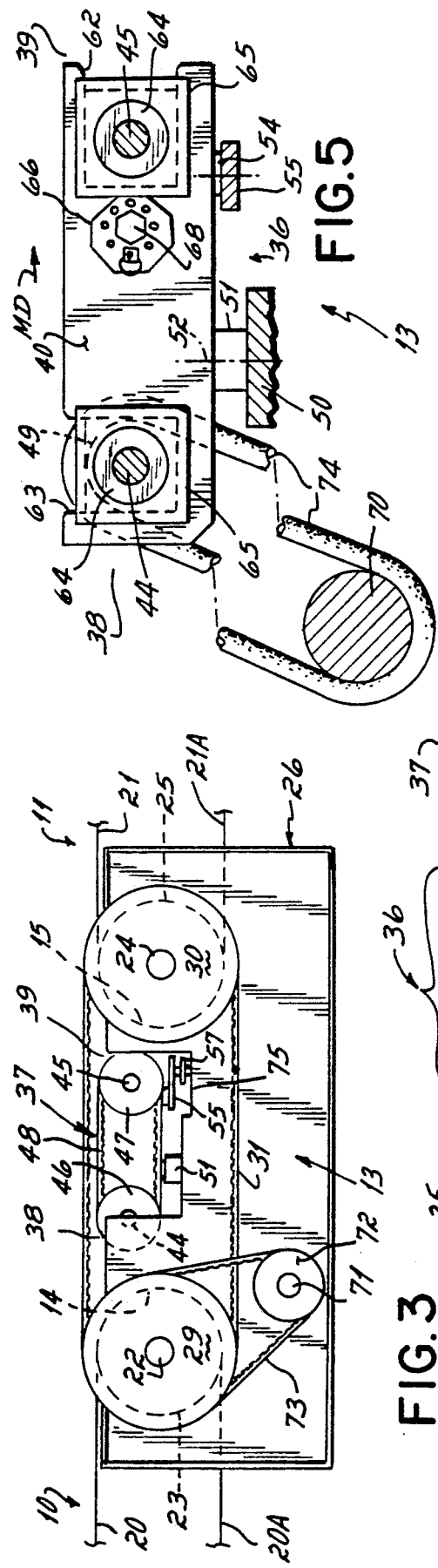

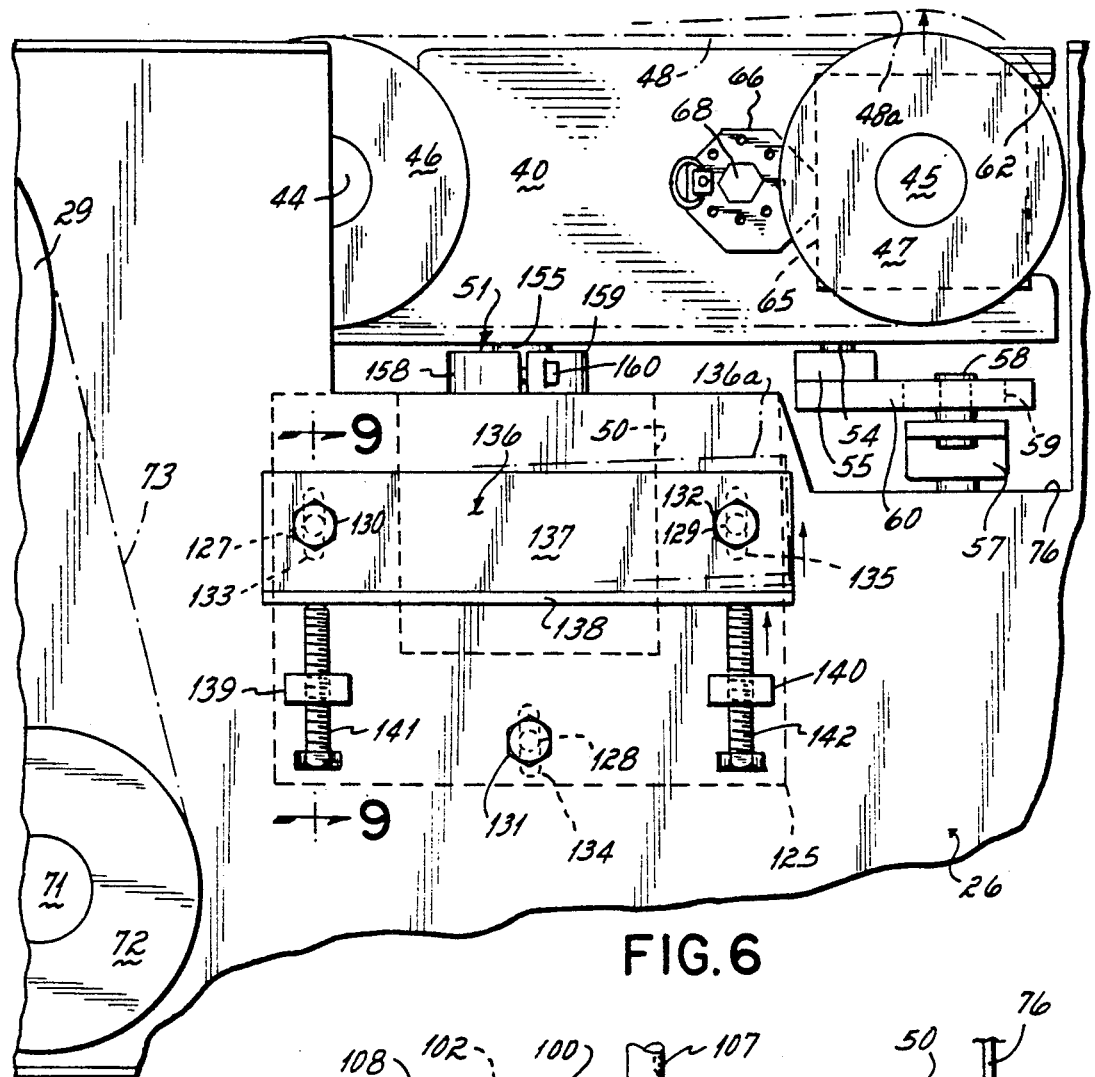
FIG. 6
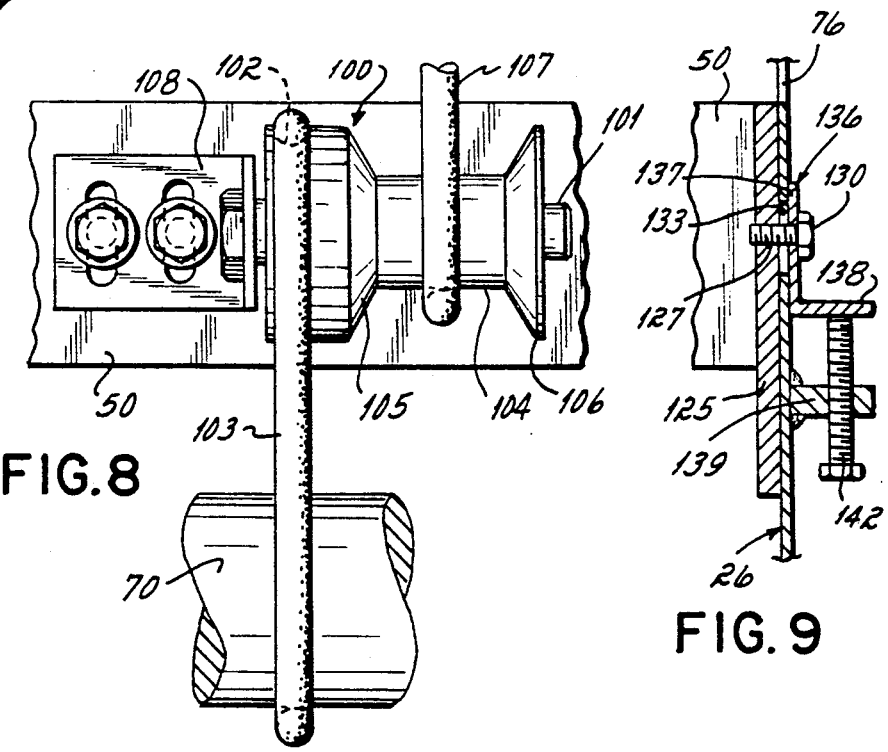
FIG. 8
FIG. 9

CONVEYING APPARATUS AND ARTICLE DIVERTER

This invention relates to conveyors and more particularly to apparatus for selectively diverting articles from one conveying direction to another direction for ejection from a conveyor or for reorientation from one part of a conveying path to another.

In many conveying applications, it is desirable to convey articles along a conveyor in an initial conveying path or direction, and to selectively divert predetermined articles from the initial conveying path or direction onto other conveyors, sort locations, spur lines, or the like, or onto another part of the conveying path.

For example, article conveyors of the roller or belt type are frequently used to convey articles past a plurality of divert or sort locations. Selectively operable apparatus can be controlled to divert the articles off the conveyor. Such apparatus has included, for example, deflector vanes for engaging articles and pushing them off the conveyor and a variety of other deflection or diversion schemes.

In roller conveyors, it is also known to use a series of so-called "pop-up" wheels between the rollers. These powered wheels are turned at an angle to the conveying direction. When actuated, they rise under the article and divert it in a direction diverging from the conveyor direction.

It has also been known, in both roller and belt conveyors, to provide an intermediate diverting section, including a plurality of assemblies, each having two wheels or pulleys carrying a powered "O"-ring shaped belt such that the belts constitute a very short horizontal diversion conveyor. The assemblies are normally in line but can be turned to line up the "O"-ring belts at a diversion angle with respect to the major conveying direction. The conveying path is thus selectively and momentarily changed to divert an article on the belts in a different direction.

In such devices the belts are wound not only around the two end wheels defining the conveying path, but downwardly about a common underlying drive shaft. Such devices do not generally pop-up into the conveying path, but have the "O"-ring belts in the same conveying plane as the conveyor path to convey articles in the conveying path or, when turned, in the divert direction.

Such divert sections have several significant disadvantages. For example, the wheels typically comprise grooved pulleys for the "O"-ring belts. When the assemblies are turned, the "O"-ring belts are presented somewhat obliquely to the oncoming articles. The leading edges of the articles hit the "O"-ring belt at an angle tending to roll the belts up over the pulley flanges, thus un-tracking them. This is a particular problem as conveying speeds are increased, for example, beyond 200 feet per minute, and the articles hit the belts even harder.

Another difficulty with such systems is that the "O"-ring belts themselves must be long enough to traverse not only the two supporting wheels or pulleys but the underlying drive shaft as well. When the belts stretch, they become loose on the pulleys which subjects them to even greater possibilities of being un-tracked.

Moreover, it will be appreciated that any such divert section must be relatively short, confined as it is normally between the conveyor side frames. Nevertheless, the articles being conveyed at speed along the conveyor must be sufficiently influenced by the diverter to change direction. The "O"-ring belts each present essentially only a "line" contact on the article bottoms. As article speed and thus inertia increase, it becomes increasingly difficult to exert enough friction, through this "line" contact on the article bottoms, to exert enough frictional "influence" to divert them from their initial conveying direction in the short distance allotted.

A still further problem with such prior "O"-ring diverter belt systems is their tendency to "skew" packages, moving over the diverter section, to one side or the other of the conveyor. In particular, when small packages of light weight are handled, such diverters must use a large number of "O"-ring diverter belts concentrated on the divert side in order to sufficiently influence the package to divert. A significant number of such belts are required in view of the limited "line" contact of each single belt of the diverter. On the other hand, when large packages reach the diverter and are not diverted, but cross over it to downstream stations, the large number of "O"-ring belts concentrated on the divert side, even though aligned with the conveyor, tend to skew the packages or laterally displace them.

In one form of prior belt conveyor, a diverter section like that noted above is provided by means of snubbing the flat continuous conveying belt beneath the divert section. The belt is oriented around an end roller or pulley upstream of the divert section, downwardly onto another pulley, across and under the divert sections, and then up onto another end pulley now downstream of the divert section. The flat article conveying belt thus defines a "U"-shaped configuration, open at the top to accommodate the diverter section, and then continuing in the conveying run. The belt return, of course, must be slung under the divert section. In this manner a diverter section is installed intermediate the ends of a single belt conveyor, for example.

Such a conveyor and diverter configuration has the advantage of requiring only a single conveyor belt drive, the divert section being slave-driven from the flat conveyor belt. The disadvantage is that the snubbing of the belt to accommodate the divert section requires a great deal of power, significantly increasing the horsepower requirements for the conveyor drive and/or limiting the length of the continuous belt run so driven.

If back-to-back or multiple diverter sections are required, such as in a sorting application where numerous divert or sort stations are required in a short conveyor run, multiple belt snubbing under the numerous divert assemblies require large additional amounts of drive power. Moreover, the conveying line speeds between divert locations cannot be changed since the same article conveyor belt is used throughout. Also, such prior flat belt systems do not provide for the use of different types of conveyors between the sort or divert locations, which are sometimes desirable or required.

Accordingly, it has been one objective of this invention to provide an improved article diverter for conveyors, and to eliminate the disadvantages noted in the prior systems.

A further objective of the invention has been to provide an improved diverter and diverter carriages for diverting conveyed articles.

A further objective of the invention has been to provide an improved divert section drive.

A yet further objective of the invention has been to provide an improved diverter with various adjustment systems for varying diverter belt speeds and orientations, and drive belt and diverter belt tension for handling wide ranges of articles, speeds and handling configurations.

To these ends, a preferred embodiment of the invention includes a diverter for diverting articles in a conveying plane from an initial conveying direction to a diverging direction. The diverter has a plurality of pivotable conveying or divert carriages presenting flat, wide, powered timing belts having upper runs in the conveying plane. Each carriage carries two preferably rotatable axles, each axle carrying wide pulleys on each outboard end so that each carriage mounts two flat diverter belts. One of the axles on each carriage includes an intermediate pulley keyed thereto and receiving an "O"-ring or round drive belt for driving the axle, and the diverter belts. The round drive belts do not themselves engage the articles.

The carriages are selectively pivoted by means of a common draw bar driven in a linear direction by a rotary actuator to orient the carriages and their diverter belts in a diversion direction at an angle to the initial conveying direction. When the diverter is aligned toward a divert or sort station, the articles are diverted thereto from the initial conveying direction.

The diverter is slave-driven from a power take off extending from one end of an adjacent conveyor such as a flat belt conveyor. That take off is also operably connected, by a drive belt or chain for example, to the next conveyor on the other side of the the divert section. The two conveyors on either side of the diverter are thus independent, apart from the slave drive, and can be driven at different speeds, if desired, by means of selection of the drive ratios (i.e. drive pulleys or sprocket diameters) between them.

Also, different conveying surfaces, surface friction coefficients, and other parameters can vary since the conveyors are independent. There is no common conveyor belt bridging the diverter, and thus no underlying belt snubbing. This reduces the drive power otherwise required if a common conveyor belt were used. Moreover, the conveyor belts can be returned without having to drop the returns beneath the diverter section and requiring further shielding or the like for safety.

The round drive belts powering the diverter belts are driven from a roller shaft propelled by the power take off. These drive belts are free to seek their own natural position on the drive roller as the diverter carriages are pivoted. Since the round drive belts only extend between a drive roller and a pulley on one diverter axle, they can be held to short length, reducing their tendency to stretch and slip. In one embodiment the diverter belts are driven at a conveying speed about 25% greater than the initial article conveying speed. This is to exert even more influence on the articles entering the diverter area. Nevertheless, this speed differential can be changed as desired over a wide range of system speeds, package sizes, package weights, or any combination thereof to provide the desired conveying and sortation or divert results.

Means are provided for adjusting the height of the carriages and the diverter belts with respect to the major article conveying plane or path, and for adjusting the path defined by the upper runs of the diverter belts at an angle with respect to the horizontal to help lift the articles away from the influence of downstream conveyors and more positively divert them to the sort conveyors, or the like.

The flat diverter conveyor belts provide several advantages over prior devices. Two belts are mounted on each carriage and, instead of a line contact as with round belts, present significantly more conveying surface for engaging articles and influencing or diverting them to change direction from the initial conveying direction. The cumulative effect of the flat belts provides significant and substantial increase in the diverting force to more positively divert articles of varying size in the short distance of diverter extension and accommodates faster conveyor speeds than attainable with round belt diverters of the same number of belts and extension. Moreover, since the diverter belts are preferably flat timing belts, they are not subject to the same untracking forces which articles generate by engaging round or "O"-ring divert belts used in the prior art.

Another advantage of the invention is that it can be easily utilized in sorting or conveying applications requiring back-to-back or adjacent divert or sort stations. While the prior diverter described above required the common conveyor belt to be snubbed under the diverter section, thereby significantly increasing drive horse-power drain, the use of the present diverter does not require this and a number of them can be used in a given space or between very short conveyors, without such power increases. Moreover, since the conveyors on either side of the diverter are independent, they can, in addition to being driven at different speeds, comprise differing forms of conveyors or conveyor surfaces having different belt surfaces, coefficients of friction, or the like. Also, it will be appreciated that the wide, flat, more evenly dispersed diverter belts of the invention do not tend to skew or laterally offset packages as do prior "O"-ring diverter belt systems.

While the above summary discusses diversion toward one side of the conveyor, the apparatus could be adapted to divert articles to either side of the conveyor at the same divert location. The carriages could thus be pivoted so as to either be aligned in an initial direction with the initial article conveyor path, or to either of two diverging directions respectively to either side of said initial direction.

A still further modification includes another carriage drive embodiment. The carriage drive, or diverter belt drive could include intermediate jack shafts or spools, each receiving a single drive belt from the aforementioned roller shaft. The jack shafts or spools include wide pulleys mounted directly beneath the carriages for driving the carriage diverter belts through the "O"-ring drive belts. Suchg "O"-ring drive belts could thus be made shorter still. An adjustable jack screw could be used to raise the carriages to adjust tension of the "O"-ring drive belts.

It should also be noted that multiple divert sections could be used back-to-back to handle particularly wide packages. The diverter carriages in each divert station could be independently operable to divert small packages at closely spaced divert stations, or to accommodate conveying environments where package centers are close together.

Also, in-line diverter sections could be used not for actually diverting packages off the conveyor, but for re-orienting packages to an opposite side of the conveyor just prior to an opposite side sort location. This can effectively eliminate the necessity to pre-position loads to one side of a sort line when a wide range of packages will be handled.

These and other advantages will become readily apparent from the following detailed described of a preferred embodiment of the invention and from the drawings in which:

FIG. 3 is an elevational view taken along lines 3—3 of FIG. 2A;

FIG. 4 is a cross-sectional view taken along lines 4—4 of FIG. 2A;

FIG. 5 is a cross-sectional view taken along lines 5—5 of FIG. 4;

FIG. 6 is an enlarged side elevational view of the diverter of FIG. 2A, and similar to FIG. 3, but showing details of the divert carriages and of the adjustable cross-bar mount which are not shown in FIGS. 1A, 1B, 2A, 2B, 3 or 4 for purposes of clarity;

FIG. 7 also shows details of the pivotal mounting of carriages and draw bar features in both embodiments;

FIG. 8 is an end view taken along lines 8—8 of FIG. 7;

FIG. 9 is a cross-section end view taken along lines 9—9 of FIG. 6, showing details of the adjustable cross bar mount, left off other FIGS. for clarity.

Conveyor Orientation

Figure 1A:
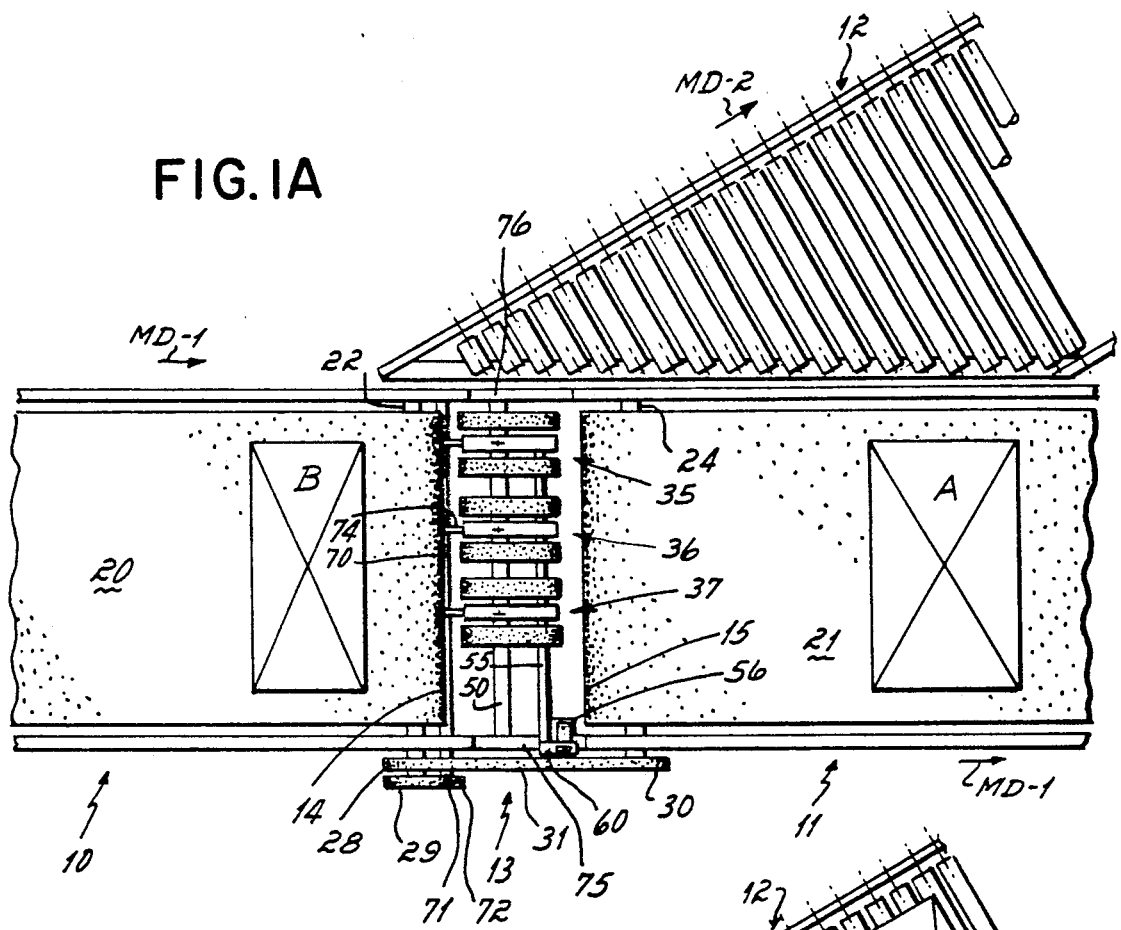
FIG. 1A is a diagrammatic plan view of a conveyor having a diverter according to the invention showing articles being conveyed in line.
Figure 1B:
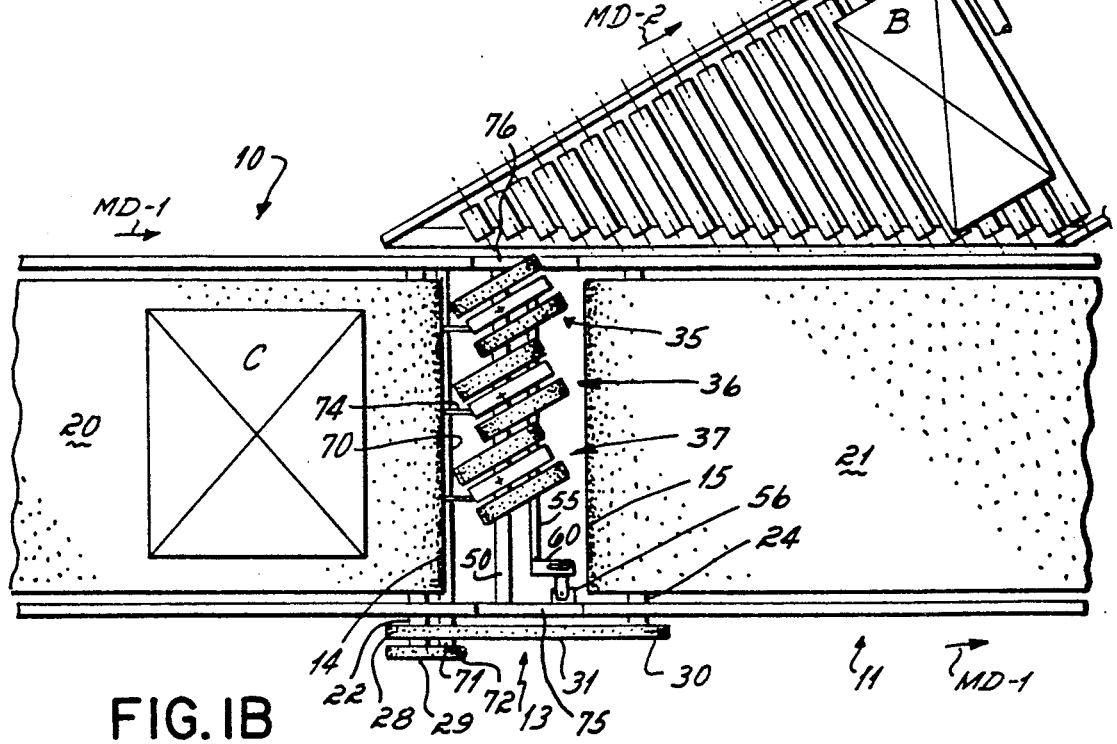
FIG. 1B is a diagrammatic plan view similar to FIG. 1A but showing the diverter pivoted to divert an article onto a diverging conveyor or sort line.

Turning now to the drawings, FIGS. 1A and 1B diagramatically illustrate various components of the invention and its operation. First and second conveyors 10 and 11 are disposed in-line to convey articles in the machine direction as indicated by the arrow marked MD-1.

A spur line or sort conveyor 12 is operably disposed adjacent to conveyors 10 and 11 to convey sorted or diverted articles in a diverging machine direction as noted by the arrow MD-2. Conveyor 12 can be powered or non-powered. Moreover, a sort chute such as used with tilt tray sorters could be used in place of conveyor 12. A sort chute with an integral package turning point or deflection to re-orient the diverted packages could also be used to receive them. In such a case, the package would maintain its orientation through the divert cycle.

In the embodiment shown, diverter 13 is disposed immediately downstream of a discharge end 14 of first conveyor 10 and immediately upstream of upstream end 15 of the second conveyor 11. While the immediately following discussion is directed to the diversion and ejection of articles from the conveyor path defined by conveyors 10 and 11, to one side thereof, the diverter section to be described can be used to divert and eject articles to either side of the conveyors 10, 11, or merely to divert articles into a different position or area in the conveying path, as on conveyor 11, for example.

As shown in FIG. 1A, an article or package A resides on conveyor 11, having been conveyed thereto from conveyor 10 over diverter 13 as shown in FIG. 1A. As shown in FIG. 1A, an article B is approaching the discharge end 14 of conveyor 10. Just as article B approaches the discharge end 14 of conveyor 10, the diverter 13 is selectively actuated to a condition as shown in FIG. 1B, which diverts the article B in a direction toward a second conveyor direction, MD-2. Diverter 13 thereby diverts article B from the direction MD-1, defined by conveyors 10 and 11 for example, toward or into a different direction, MD-2.

Also, as shown in FIG. 1B, a third article C (not shown in FIG. 1A) following article B has now appeared on conveyor 10. If the diverter 13 remains in the condition shown in FIG. 1B, then article C will be diverted onto the conveyor 12 in the direction of MD-2. If, however, the diverter 13 is selectively oriented back to the condition as shown in FIG. 1A, then article C would be conveyed downstream in the direction of MD-1 onto conveyor 11. The diverter 13 is thus selectively actuable, as will be further discussed, to divert articles from an initial conveying direction, such as MD-1, toward or into a different direction, such as that shown by the arrow MD-2.

As shown in FIGS. 1A and 1B, conveyors IO and 11 comprise separate and independent belt conveyors, conveyor 10 having a belt 20 and conveyor 11 having a separate and different belt 21. The discharge end of the conveyor 10 is defined in part by shaft 22 and a preferably crowned end pulley 23 (see FIG. 3) for facilitating belt 20 tracking. The upstream end 15 of the conveyor 11 is in part defined by shaft 24 and a preferably crowned end pulley 25, as also best seen in FIG. 3, for belt 21. The shafts 22 and 24 are respectively journalled in side frames 26 and 27, comprising channels or other structural side members for the respective conveyors and for the diverter 13, as will be appreciated. As shown in FIG. 3, the respective side channels 26 and the opposite channel 27 may be relatively short, spanning the diverter 13 and the respective ends of the conveyors 10 and 11. Otherwise, the side frames 26 and 27 could simply be elongated conveyor frames, further defining the respective sides of conveyors 10 and 11 as desired, or conveyors 10 and 11 could be separately framed, with diverter 13 mounted therebetween on its own side frames as will be appreciated.

Drawing further attention to the ends 14 and 15 of the conveyors 10 and 11, a power take-off is provided at the end of conveyor 10 and includes pulleys 28 and 29 secured to shaft 22 of conveyor 10. A third pulley 30 is secured to shaft 24 and a drive means, such as a belt 31, is wound about pulleys 28 and 30 so that conveyor 11 and belt 21 thereof are driven by this slave drive from conveyor 10. Each of the respective belt returns, 20A and 21A, of the respective conveyors 10 and 11 extend generally parallel to the upper conveying runs of belts 20 and 21 respectively. Other than the slaved drive through belt 31, the conveyors 10 and 11 are operatively independent of one another.

It will be appreciated then that two different conveyors could be utilized. For example, conveyor 10 could be a belt conveyor as shown, while conveyor 11 could be a roller conveyor. In another alteration, conveyor 11 could utilize a conveyor belt of different construction or of different surface characteristics like a different coefficient of friction from the belt on conveyor 10, for example, where that is desired.

It will also be appreciated that by selection of the parameters of the pulleys 28 and 30, for example, conveyors 10 and 11 can be driven at different effective conveying speeds. Conveyor 11, for example, could be driven at a higher line speed than conveyor 10, so as to facilitate article separation in the case where articles are closely oriented on the conveyor 10 as they approach the diverter 13. This could facilitate the clearing of articles conveyed over the diverter 13 as shown in FIG. 1A, to reduce the possibility that they may interfere with a following article which will be diverted.

It should also be understood that while widely separated articles A, B and C are diagramatically shown in FIGS. 1A and 1B, the articles could be very close together. Preferably, and while the articles A, B and C as shown on the conveyors 10 and 11 are centered, it is also preferable to urge the articles, at least on conveyor 10, in an upward direction, so they are closer to that side (frame 27) of the conveyor on which the third conveyor 12 or sort location is disposed. It should also be appreciated with respect to FIG. 1B, that while the diverter 13 is shown in general alignment with the conveyor or sort direction MD-2, that particular alignment may not be necessary, it only being required that the diverter be aligned to divert articles in some direction, at an angle to the direction MD-1, in order to cause them to move away from or in a direction at an angle to the initial conveying direction MD-1.

DIVERTER SECTION AND CARRIAGES

Figure 2B:
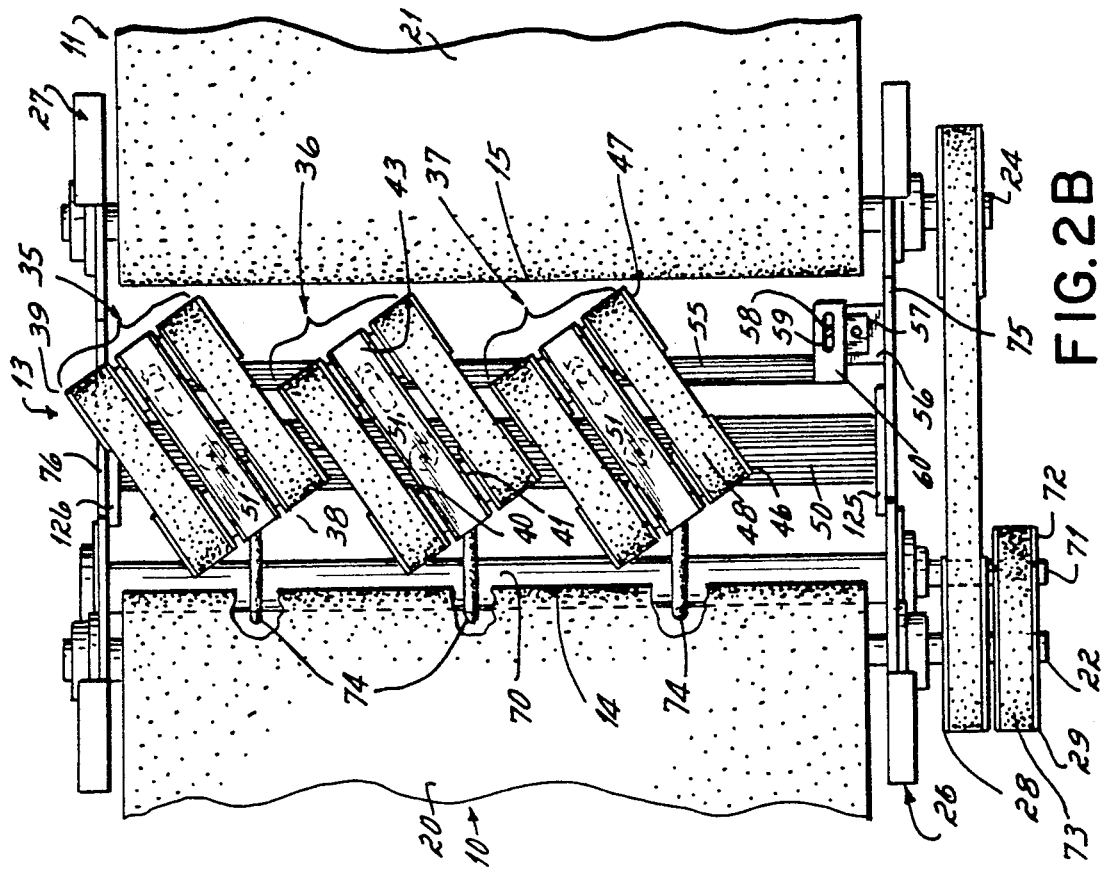
FIG. 2B is an enlarged diagrammatic plan view showing more of the details of the diverter in FIG. 1B.
Figure 2A:
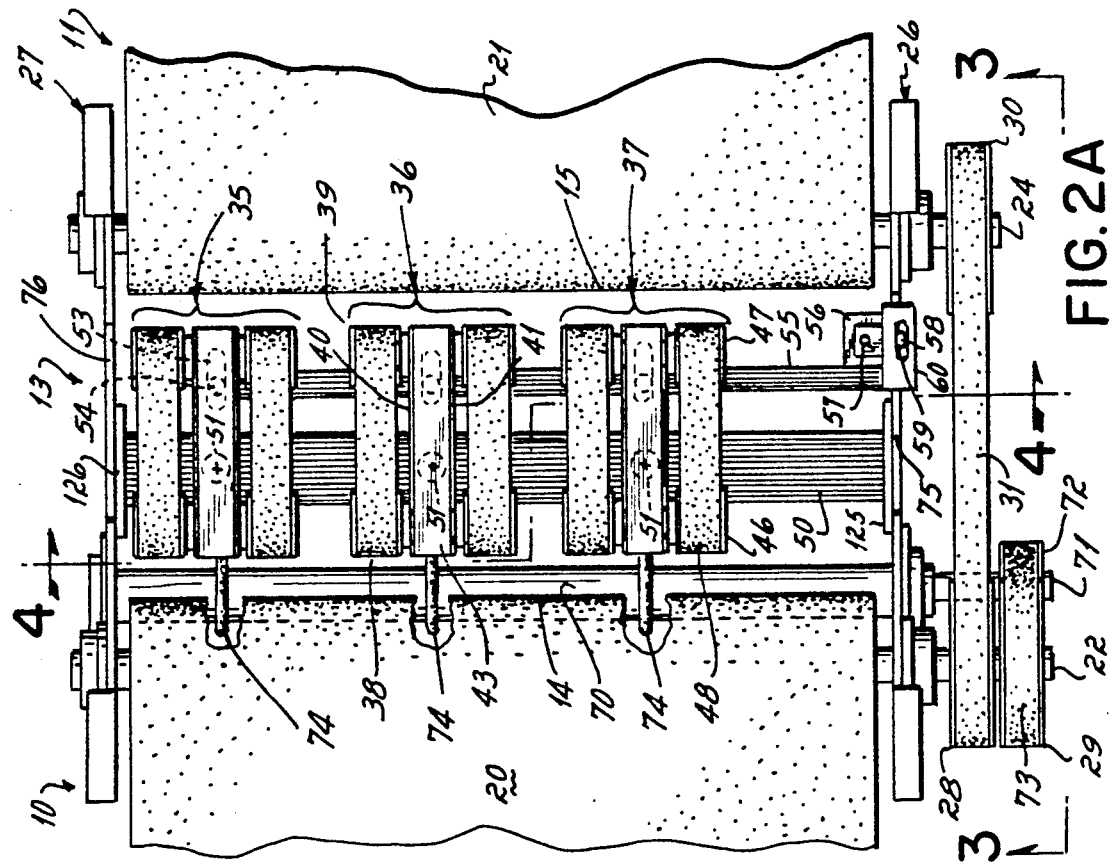
FIG. 2A is an enlarged diagrammatic plan view showing more of the details of the diverter in FIG. 1A.

Turning now to a description of the diverter 13, it will be appreciated that the diverter 13 includes three elongated carriages 35, 36 and 37. These carriages are generally elongated, as shown in FIGS. 1A and 2A, from an upstream end near the discharge end 14 of conveyor 10 to a downstream end proximate the upstream end 15 of conveyor, II. As an example, carriage 36 has an upstream end 38 and a downstream end 39, as indicated in FIG. 5. When the carriages 35, 36 and 37 are in the position as shown in FIG. 1A, they are thus elongated in a direction generally parallel to the direction MD-1.

The carriages 35–37 are preferably identical. Each of the carriages has opposed, parallel side plates 40 and 41 elongated between upstream and downstream ends 38, 39, a bottom plate or member 42 and a top plate or member 43. Each carriage further includes an upstream axle 44 and a downstream axle 45. These axles extend outboard of the side plates 40 and 41 and a diverter pulley is mounted on each end of each axle 44 and 45. Thus, for example, as perhaps best seen in FIG. 4, a diverter pulley 46 is mounted on the outboard ends of the rear or upstream axle 44, while a diverter pulley 47 is mounted on each end of the forward or downstream axle 45. Each pulley 46 is aligned then with a downstream pulley 47, such that a diverter belt 48 can be wound around each of the aligned sets of pulleys to define an upper diverter run.

It will be appreciated that diverter belt 48 is preferably a flat timing belt having internal cogs as perhaps best seen in FIG. 3. Diverter belt pulleys 46 and 47 may also have cogs if desired.

DIVERTER BELT DRIVE

Each of the upstream axles 44 is fitted with a carriage or diverter belt drive pulley 49, preferably mounted between the side plates 40 and 41, and keyed to axle 44. Rotation of pulley 49 rotates axle 44 and thus the upstream diverter belt pulleys 46.

Figure 7:
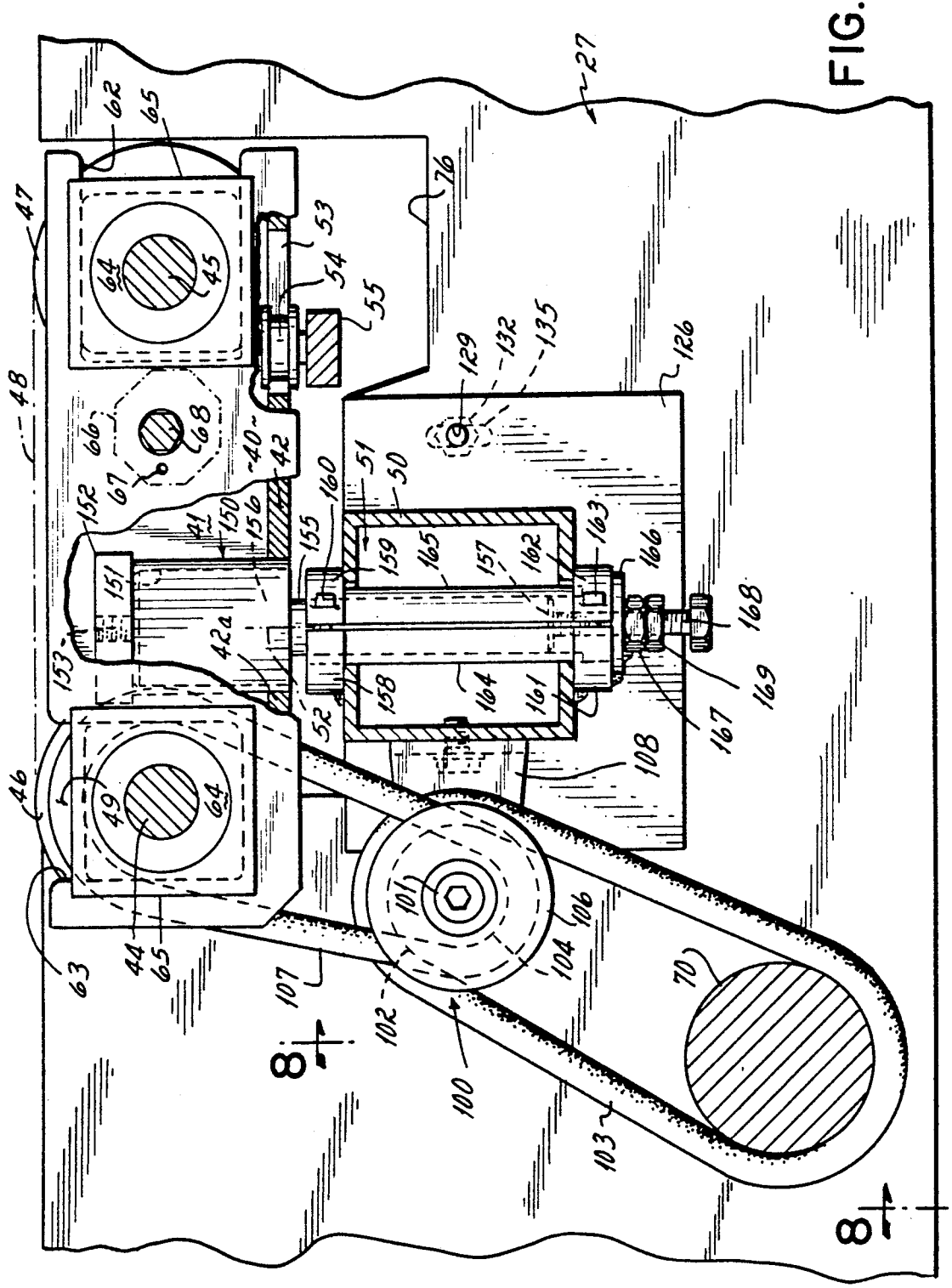
FIG. 7 is a side elevational view in partial cross-section similar to FIG. 5, of a carriage and of an alternative carriage drive apparatus.

Drawing further attention to the carriages 35–37, FIGS. 4–7 shows further details. FIG. 7 shows details of the carriages common to all embodiments, even though it also includes features of an alternative drive.

Each of the side plates 40, 41 of the respective carriages provide means for mounting bearings or journals for the axles 44, 45. Particularly, there is formed in side plate 40, a forward opening slot 62 and an upward opening slot 63. A bearing 64 is mounted within two spaced apart and square plates 65, comprising a bearing block, the plates being spaced apart a distance slightly greater than the thickness of the respective side plates 40, 41. In this manner, the two plates 65, securing the outer races of bearings 64, can be slidably mounted on the side plates 40, 41 respectively.

In particular, at a forward end 39 of the carriage as shown in FIG. 5, the slide plates 65 are mounted to the side plates 40, 41 by insertion in a direction generally parallel to the elongation of the carriages. The bearings 64 at the upstream end 38 of the side plates 40, 41, however, are mounted there by movement in a direction perpendicular to the elongation of the carriage.

Axles 44 and axles 45, which are journalled in the bearings and plates, tend to be pulled together by the diverter belts 48. The mounting then, of the respective journals for the axles 44 and 45 through these perpendicular motions thus secures the axles 44 and 45, and holds the belts 48 in a predetermined tension condition. The mounting of the rearward or upstream axle 44 prevents it from moving forwardly or downstream in a machine direction, such as the arrow MD in FIG. 5.

To adjust the tension of belts 48, a cam plate 66 is mounted outboard of each plate 40, 41 to a hex shaft 68 extending across and through aligned round holes in plates 40, 41. These cam plates 66 present, for example, a plurality of different surfaces for adjustably tensioning belts 48 by engaging the bearing plate or block 65 and holding it in one of a number of different positions. Preferably although not shown, 16 different cam surfaces can be used. These cams can thus be turned to adjust the position of axle 45 with respect to axle 44 so that tension of belts 48 can be adjusted. The cams are held in angular position by a pin or screw extending through at least one cam plate on each carriage into a hole 67 in the carriage side plate. A plurality of holes are provided in either cam plate (as shown) or in side plate to accommodate a set pin or screw in a plurality of different positions corresponding to the desired cam positions. Hog rings hold the cam plates 66 on hex shafts 68, while the set pin or screw is secured in hole 67 in the side plate 40, for example.

CARRIAGE PIVOT

Turning now momentarily to FIG. 7, that FIG. shows details of the carriage pivot mount. Such pivot mount is used for carriages both in the preferred embodiment and in the alternate drive embodiment which is also shown in FIG. 7.

The carriages are each mounted on the cross bar or square tube 50 by a pinion means 51 to rotate about axis 52. Pinion means 51 as shown includes numerous elements associated with cross bar tube 50 and with each carriage.

More particularly, a square bearing block 150 is welded in each carriage just upstream of floor plate 42. This square block 150 is provided with a cylindrical bore 151 and a square cap 152. Cap 152 has a treaded bore 153, noted later. A bearing comprises a depending shaft 155 extends from enlarged bearing race 156 which is oriented in cylinder bore 151 in block 150. Shaft 155 extends downwardly to lower end 157. The bearing can be of any suitable type, however, the bearing here described is NSK Bearing #885730.

An adjustable collar and split sleeve apparatus is mounted on bar 50. An upper collar includes a half collar 158, half collar 159 and bolts 160 (one shown) for drawing the collar halves together. A lower collar includes collar half 161 and collar half 162 with bolts 163 (one shown) for drawing the collar halves together. Collar halves 158, 161 are welded onto bar 50 while respective collar halves 159, 162 are free, except for their bolts.

A semi-annulus 164 in the form of a longitudinally split tube is fixed to collar halves 158, 161 and extends therebetween through a hole in the upper and lower sides of bar 50. A second, complimentary semi-annulus 165 in the form of a split tube is fixed to collar halves 159, 162 and extends therebetween through the same hole in upper and lower walls of bar 50.

The stem 155 of the bearing extends downwardly between collar halves 158, 159 and split tubes 164, 165. When the carriage is properly height adjusted, the collar halves 159 and 162 are respectively tightened toward halves 158, 161 to grip shaft 155 between split tubes 164, 165, thereby pivotally holding the carriage in a desired vertical position.

A washer 166 is welded to half collar 161 and a nut 167 is welded to washer 166. A jack screw 168 is threaded into nut 167 and extends to abutting supporting relation with lower end 157 of bearing shaft 155.

When half collars 159, 162 are loosened, screw 168 can be turned to set the height of bearing shaft 155, and thus that of the carriage, with respect to bar 50. Lock nut 169 holds jack screw 168 in place.

It is noted that the bottom area of the carriage upstream of bearing block 150 is not covered by a floor plate 42, but may be reinforced near block 150 with a narrow floor plate 42a. The remaining open floor accommodates a carriage drive belt, elsewhere described.

It is also to be noted that as the bar 50 is raised, lowered, or canted as described herein, the carriages remain freely pivoted to the bar, and follow its orientation.

Cap 152 on bearing block 150 serves as a stop for bearing 156. Bore 153 is threaded to facilitate removal of the carriage from the bearing for bearing replacement. A bolt can be twisted into bore 153 against bearing element 156 to push it out of block 150.

CARRIAGE MOUNTING BAR

A cross member or bar 50 comprises a hollow, square tube mounted between side frame members 26 and 7. The carriages 35–37 are pivotably mounted on this cross member 50 by pinion means 51 as described, or by any suitable construction. Details of the preferable pinion means 51 are described above. In any event, the carriages are mounted to smoothly rotate about the pivot axis 52, also as shown in FIG. 5 and in FIGS. 2A and 2B. As shown in the figures, the pinion means 51 and the pivot axis 52 is located more closely to the upstream end 38 of the respective carriages, than to the downstream end 39 thereof.

The mounting bar 50 extends between frame members 26, 27 and at each end is welded to a flat, "U"-shaped plate 125, 126, see FIGS. 6,7. Plates 125, 126 each have three mounting holes 127, 128, 129 for receiving respective mounting bolts 130, 131, 132, it being understood that three separate bolts are used at each respective plate 125, 126. The side frames 26, 27 each have 3 vertically elongated slots 133, 134, 135 for receiving respective bolts 130–132 to permit vertical adjustment of plates 125, 126 and bar 50.

An angle clip 136 has a vertical leg 137 abutting frame 26 and a horizontal leg 138. Clip 136 has two holes oriented to register with holes 127, 129 in plate 125 (FIG. 6) and slots 133, 135 in side frame 26. A similar clip is used on the other side of the conveyor or diverter at plate 27.

Nuts 139, 140 are welded to each side of frame 26 (and frame 27) and jacking screws 141, 142 are disposed therein for engaging leg 138 of clip 136 to raise or lower bar 50 as desired when bolts 130–132 are loosened.

It will also be appreciated from FIG. 6 that the clip 136, bar 50 and carriages thereon can be tilted by this means. Bolt 131 is removed and jacking screws 141, 142 adjusted not only to provide correct height, but desired angle of bar 50 and more particularly, diverter belts 48.

For example, when jacking screw 142 is raised more than jacking screw 141, angle clip 136 is lifted at its right-hand or downstream end to the dotted line position 136a. This lifts the downstream end of diverter belt 48 to its dotted line position 48a.

Thus, when articles engage the diverter, it can effectively lift them to even more greatly influence the articles in the divert direction. Also, such lifting delays, if not fully prevents, engagement of the articles by the downstream conveyor 11, such as may tend to pull incompletely diverted articles down conveying path MD-1 and thus interfere with the divert operation.

This ability to cant or raise the downstream end of diverter belts 48 by tilting the carriages provides a substantial parameter variable useful in tuning the diverter for a wide range of conveying and handling environments and a wide range of article weights and sizes.

DRAW BAR

A draw bar 55 is disposed across the diverter 13 and is connected or pivoted to the bottom plate member 42 of each of the respective carriages, for the purpose of selectively pivoting the carriages about pivot axis 52. More specifically, the draw bar 55 may be connected to the bottom plate 42 of the carriages by means of a double headed pinion 54, or any other suitable fastener, extending through an elongated slot 53, in bottom plate 42, as perhaps best seen in FIGS. 2A and 2B and FIG. 7. Thus it will be appreciated that as the draw bar 55 is reciprocated in a direction toward the frame member 27, for example, the carriages are pivoted from the position as shown in FIGS. 1A and 2A to the position as shown in FIGS. 1B and 2B. When the draw bar 55 is retracted, the carriages are returned to the positions shown in FIGS. 1A and 2A, where the carriages and the upper conveying or diverting runs defined by the diverter belts 48 are aligned with the direction MD-1.

Alternately a synthetic grommet having the same shape as the pinion 54 is secured in a hexagonal opening in bottom plate 42. A shoulder bolt extends through the grommet into draw bar 55. Such grommet isolates shock loading into the carriage and reduces noise.

DRAW BAR ACTUATOR

The draw bar is preferably actuated by a pneumatically controlled rotary actuator 56. While electrical actuators or other actuators could be used, one suitable pneumatic rotary actuator is actuator model S-132-180, manufactured by Turn-Act Incorporated of Louisville, Kentucky. Such rotary actuator is provided with an actuator arm 57, having an upstanding pin 58 disposed within a slot 59, formed in draw bar arm 60. The rotary actuator is operable to rotate arm 57 and pin 58 through 360 degrees, in single increments of 180 degrees. Accordingly, a first actuation of the rotary actuator 56 would move the pin 58 from its position as shown in FIG. 2A to its position as shown in FIG. 2B, thereby extending the draw bar 55 to pivot the carriages 35-37. When the actuator is again energized, it will operate through a consecutive 180 degree arc to return the pin to its position as shown in FIG. 2A, thereby retracting the draw bar 55 and returning the carriages 35-37 to their position aligned with direction MD-1. A selectively operable valve V is used to control the passage of compressed air to actuator 56 to cause it to rotate in a well-known manner. Actuator 56 and valve V can be comprise a part of this invention, to actuate draw bar 55 in time with packages or articles on conveyor 10. Any suitable form of actuator and control can be used as will be appreciated.

It will be appreciated that each of the pins 54 have an enlarged head, which mounts and secures the draw bar beneath the carriages, but in addition permits some sliding motion of the draw bar with respect to the carriages. Thus the slots 53 in bottom members 42 of the carriages, in combination with the slot 59 in the draw bar arm 60, are not so elongated as to permit any undesired slop in the motion of the arm as it is actuated, but do accommodate the arcuate motion of carriages 35 36 and 37 and the rotary movement of pin 58. Additionally, the slots accommodate some degree of tolerance variation in the manufacture of the apparatus. Of course, the draw bar 55 could be directly pivoted, without any lost motion or play, to the various carriages and the arm 60 and slot 59 configured accordingly, with respect to the rotary circle described by the pin 58, as the rotary actuator 56 is operating. It will be appreciated that a shock and noise isolating grommet could be used in slot 53.

DIVERTER DRIVE

Continuing further now with the description of the diverter, a drive shaft or drive roller 70 is also journalled in the side frames 26 and 27, roller 70 being mounted on shaft 71. Shaft 71 is mounted by flanged bearings adjustable on frames 26, 27 to provide adjustment of roller 70 and the drive belts, and to accommodate belt or roller changes. A pulley 72 (FIG. 3) is mounted on the outboard end of shaft 71 and a drive belt 73 is operably disposed over power take off pulley 29 and pulley 72 to drive the shaft 71 and thus roller 70. Of course, a drive chain could be used in place of belt 73.

In one embodiment (FIGS. 2A, 2B and 3) a plurality of carriage or diverter drive belts 74 (one for each carriage) are entrained about the respective carriage drive pulleys 49 and the drive roller 70. When the conveyor 10 operates, the belt 20 drives the pulley 23 which drives shaft 22, thereby rotating pulleys 28 and 29 of the power take off. Pulley 29 drives pulley 72 through belt 73 and thus drives the roller 70 through shaft 71. This then drives the belts 74, which are preferably round "O"-ring drive belts. These belts, by virtue of their connection to the respective carriage drive pulleys 49, drive the rear or upstream axles 44 of each carriage, since the diverter pulleys 46 are keyed to the upstream axles 44. These pulleys drive the diverter belts 48.

As noted, shaft 71 can be mounted between the side frames 26 and 27 so that it is adjustable in a general vertical direction for varying the tension on the "O"-ring or round drive belts 74. It will also be appreciated that the belts 75 are free to "wander" on roller 70, and that they seek and find respective lateral positions as the carriages 35-37 pivot.

It will be appreciated from this description that the drive belts for the diverter belts 48 do not themselves engage the articles being conveyed or diverted. At the same time, it will be appreciated that the diverter belts 48 are relatively short and only must extend through the diverter runs, the return, and around the respective diverter pulleys 46, 47. At the same time, the drive belt 74 must only be of a length to extend around the drive roller 70 and the carriage drive pulleys 49. Thus, none of the belts are so excessively long as to require undue consideration to tension adjustment.

At the same time, it will be appreciated that the diverter belts 48 are flat. Even if hit by packages when the carriages are rotated to the position shown in FIG. 2B, for example, this engagement does not tend to roll them or otherwise untrack them from their respective pulleys.

It will be appreciated that the side frames 26 and 27 include relieved portions, such as at 75 and 76. The relief portion 75 in the side frame member 26, for example, accommodates the positioning of the draw bar and rotary actuator apparatus on that side of the conveyor, while the relieved portion 76 and side frame member 27 accommodates the rotation of the upper carriage 35, as shown in FIG. 2B.

It will be appreciated that the preferred embodiment of the invention, as described, is suitable for diverting articles from the conveyor 10, for example, to the conveyor 12. The extent of the elongated carriages and the diverter runs defined by the diverter belts 48, together with the separation distance between the respective ends 14 and 15 of the conveyors 10 and 11 can be selected to handle differing ranges of various articles or packages to be conveyed and diverted.

As suggested in the figures, and particularly FIGS. 1A and 1B, the invention is suitable for diverting a variety of article sizes where the articles are either shorter or longer than the extension of the diverter belts 48 in the upper diverter run. For example, while the figures illustrate the diversion of an article B onto the conveyor 12, the same diverter 13 can be utilized as shown in FIG. 1B, to divert an article the size of article C onto the conveyor 12, if desired.

The diverter belts 48 can be run at a speed in excess of the linear or conveying speed of the belt 20. This might preferably be about 25% faster, in order to enhance the influence exerted by the flat diverter belts 48 on any article being diverted, so as to positively divert it from the direction MD-1 toward the direction MD-2 for diversion from the initial conveyed direction MD-1 to or toward a conveyed direction or sorted direction MD-2. Otherwise, many other speed ranges and ratios can be selected to provide the desired influence on the articles to move them as desired.

Preferably, and as indicated perhaps best in FIG. 3, the diverter run defined by the belts 48 is approximately in the same plane as the conveyor plane defined by the belt 20 of conveyor 10 and the conveyor plane as defined by the upper run of the belt 21 of conveyor 11. If desired, the conveyor run defined by the belt 21 of conveyor 11 could be slightly lower, in order to enhance the diversion action of the diverter 13, or to reduce the influence of the belt 21 on any articles being diverted onto the conveyor 12.

It will be further appreciated that the diverter belts 48 define a relatively large area of diverter belt contact for positively influencing the articles so that the articles are positively diverted and do not skip over the diverter 13, even if slightly influenced by the belt 21.

It will also be appreciated, of course, that separate and independent diverter carriages can be mounted in their own frame between totally separate and independent conveyors, with an appropriate power take off or drive being used for the diverter and between the respective conveyors as required.

It will also be appreciated that there is no snubbing or direction of a common conveyor belt underneath the diverter 13, such as would drain power from the single conveyor drive, nor is there any reason to have an under slung conveyor belt return beneath the diverter section 13.

While a particular application of the invention including a one-sided diverter embodiment has been specifically described, other embodiments and modifications can be used.

As an example, it will be appreciated that the carriages 35-37 could be pivoted to either side of the conveyors 10, 11 to divert articles to either side. This could be accomplished, for example, by any suitable actuator of pneumatic or electric operation which would center the carriages for in-line conveying, pivot them to one side for diverting toward that side, or pivot them toward the other side for diverting toward that side. In such an application, an actuator (not shown) would have three positions, and rotor 57, arm 60 and slot 59 all sized and oriented to this end.

In still another example, a diverter section comprising a plurality of carriages such as 35-37 could be used to divert articles toward a second direction for orienting articles to one side of the conveyor or the other side as desired, but without ejecting them from the conveyors. Where articles on a conveyor are diverted off the conveyor at different locations and to either side, it is preferable to align the articles against that side of the conveyor from which they will be diverted or ejected. Accordingly, a diverter section 13 like that described herein could be used just downstream of a sort location at the left side of a conveyor to orient non-diverted articles remaining on the conveyor to its other side for opposite side sort at the next sort or divert station.

Figure 10:
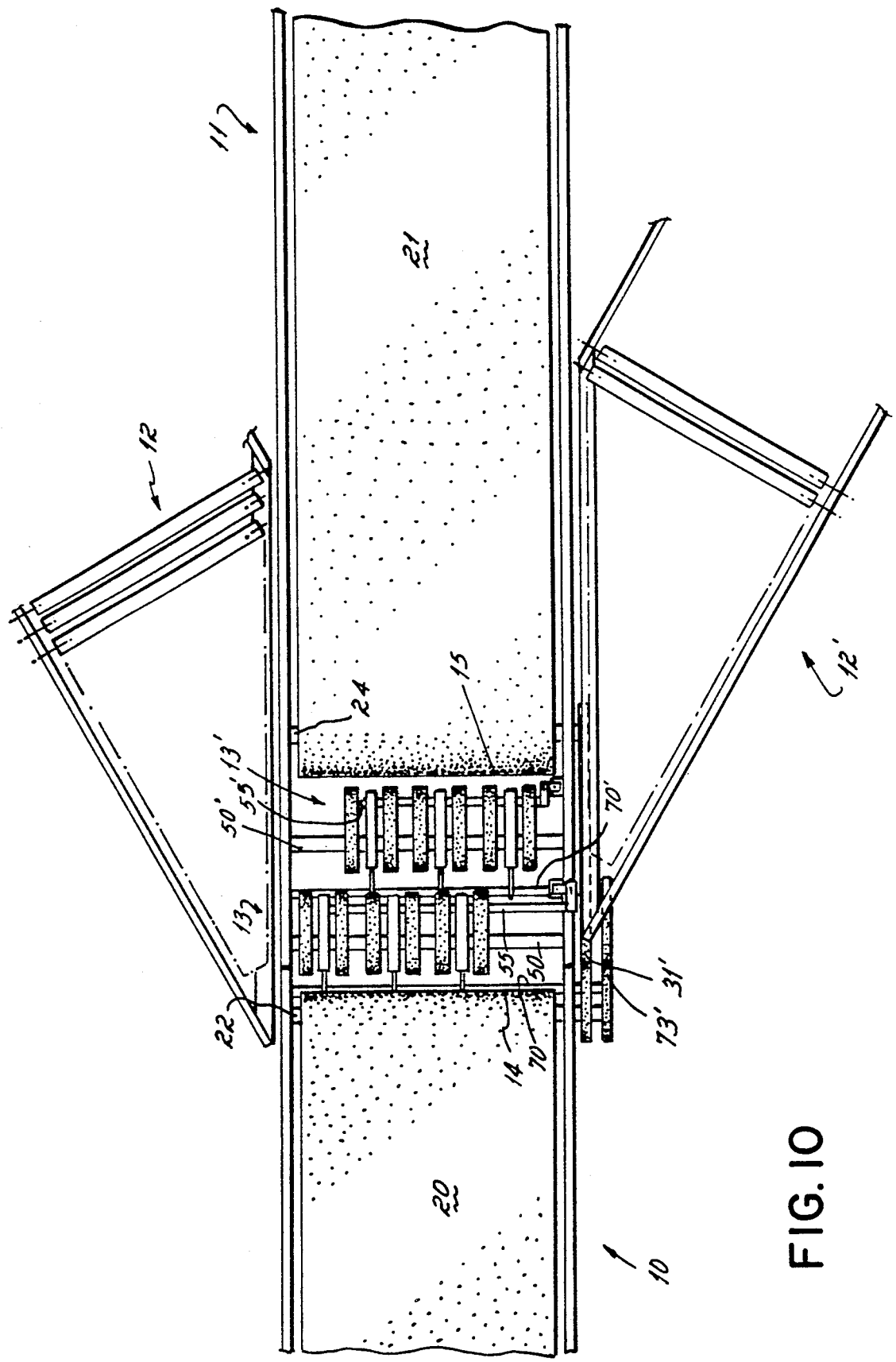
FIG. 10 is a diagrammatic plan view showing an alternative divert system with back-to-back diverters.

In still another example, illustrated only diagramatically in FIG. 10, back-to-back diverter sections 13, 13' could be used in a variety of functions. Carriages in each back-to-back divert section could be aligned in parallel directions to handle wide packages. Such back-to-back divert section carriages could also be independently operable to opposite sides or to the same side to handle closely spaced or small articles in sort systems with closely spaced sort locations.

In such a system, a power take off drive belt 73' could be used to drive both diverters 13, 13' and a power take off belt 31' elongated to drive downstream conveyor 11. These belts 73' and 31' would, of course, be trained over suitable idler pulleys to position them beneath a sort conveyor 12' if the diverter 13' is used in this manner.

ALTERNATIVE CARRIAGE DRIVE

An alternative carriage drive is illustrated in FIG. 7-9. In this embodiment, like element will be numbered as in the prior embodiment while new elements will be designated with new numbers. In this embodiment, the carriages are as described above and the diverter section is also constructed and oriented as noted above, for example, between an upstream conveyor and downstream conveyor (neither of which are shown).

Turning to FIGS. 7 and 8, a drive roller 70 is driven from the power take off of the upstream conveyor as described above. There are no "O"-ring drive belts, however, extending from roller 70 to pulleys 49. Instead, this embodiment provides structure for driving pulleys 49 of the carriages through an intermediate jack spool 100 mounted on stub shaft or shoulder bolt 101. Jack spool 100 includes a grooved portion 102 for receiving an "O"-ring drive belt 103 extending operatively about roller 70, and a wide groove 104 with side flanges 105, 106. An "O"-ring drive belt 107 is operatively engaged about pulley groove 104 and extends upwardly in driving relation about pulley 49 of a respective carriage to drive the diverter belts thereof.

Shoulder bolt 101 is secured in a right angle clip 108 vertically adjustably mounted on cross bar 50 of the diverter section. This clip is vertically adjustable through slots as shown to adjust the tension in belt 103, although the shaft 71 for roller 70 is mounted in flange bearings on side frames 26, 27 for additional vertical adjustment to this end. Movement of clip 108 will also adjust tension in belt 107, although another adjustment structure is provided for this as has been described (i.e. vertical adjustment of carriages by pinion means 51 or by mounting plates 125, 126).

By these means, belts 107 for each carriage are free to translate in groove 104 between flanges 105, 106 as the carriages pivot between their respective positions. Also, by selecting varying spool and groove diameters, many speed ranges of the diverter belts on the carriages can be provided.

This alternate drive provides additional speed adjustment means as noted and uses still shorter drive belts which do not stretch to such an extent as longer belts may. Moreover, the final drive belts 107 are presented more vertically to the carriages, facilitating their rotation.

It should also be appreciated that the mass or at rest inertia of each carriage is low such that they are easily and quickly pivotable, without requiring the turning of massive frames, side plates and other apparatus associated with prior diverters. This facilitates quick pivoting action in each divert cycle, the speed of which is important as article conveying speeds increase.

While many other alterations and modifications will become readily apparent to those of ordinary skill in the art without departing from the scope of the invention, applicant intends to be bound only by the claims apended hereto.

I claim:

1. Conveying apparatus including a diverter for diverting articles being conveyed in an initial direction toward a second direction, said diverter being disposed in a first conveyor path defined by a first conveyor, said path extending along said initial direction and said apparatus comprising:

a plurality of diverter carriages;

two diverter belts on each carriage; the belts each defining an upper diverter run;

means for driving said diverter belts to convey articles therein in a direction along said upper diverter run; and means for selectively pivoting said carriages between two positions such that said diverter run in one position of said carriages is substantially aligned with said initial direction and said diverter run in a second position of said carriages is aligned in another direction to divert articles toward said second direction.

2. Conveying apparatus as in claim 1 wherein each said carriage includes at least two axles extending outwardly on either side of said carriage, a diverter belt pulley mounted on each end of each axle with a pulley on one axle being aligned with a pulley on another axle, said two diverter belts being wrapped around aligned pulleys, and a carriage drive pulley mounted on one of said axles for driving said axle and each diverter belt.

3. Conveying apparatus as in claim 2 further including a common drive roller, a plurality of drive belts, each drive belt being operatively wrapped around a respective carriage drive pulley and said common drive roller such that rotation of said drive roller drives each carriage drive pulley and all said diverter belts.

4. Conveying apparatus as in claim 3 wherein said diverter is disposed proximate a discharge end of a first conveyor having power take off means, and further including drive means operatively associated with said power take off means for driving said common drive roller.

5. Conveying apparatus as in claim 4 wherein said diverter has a downstream end disposed proximate a second conveyor and further including drive means extending from said power take off means for driving said second conveyor.

6. Conveying apparatus as in claim 5 wherein said first and second conveyors are otherwise operatively independent of each other.

7. Conveying apparatus as in claim 2 wherein each said carriages includes respective journal means for each said axle, a downstream axle journal means being slidable into position on said carriage from a downstream end thereof and an upstream axle journal means slidable into position on said carriage from above said carriage, said carriage drive pulley being mounted on said upstream axle.

8. Conveying apparatus as in claim 7 wherein each of said carriages comprises two parallel side plates, each defining respective recess means for receiving said journals.

9. Conveying apparatus as in claim 8 wherein each of said carriages further includes a carriages bottom plate proximate lower portions of said side plates, wherein said diverter further includes a cross member, and wherein said carriage bottom plates are pivoted to said cross member.

10. Conveying apparatus as in claim 9 further including a common draw bar operatively connected to said carriages proximate downstream ends thereof for pivoting said carriages in unison.

11. Conveying apparatus as in claim 2 wherein said diverter belts comprise flat timing belts defining said upper diverter runs.

12. Conveying apparatus as in claim 1 further including a common draw bar means connected to each carriage proximate a downstream end thereof for pivoting said carriages between said positions.

13. Conveying apparatus as in claim 12 further including rotary actuator means for selectively extending and retracting said draw bar means to pivot said carriages between said two positions.

14. Conveying apparatus as in claim 1 wherein said diverter belts are driven at a linear speed in excess of the speed of articles conveyed in said initial direction upstream of said diverter.

15. Conveying apparatus including diverter means for diverting conveyed articles from a first conveyor onto another conveyor and including:

a first conveyor for conveying articles in a first direction;

a second conveyor downstream of said first conveyor for conveying articles further in said first direction;

a third conveyor for conveying articles in a second direction and having an upstream end proximate said first and second conveyor; and diverter means disposed between said first and second conveyors for conveying articles between said first and second conveyors, and alternatively between said first and third conveyors, said third conveyor being oriented proximate said diverter means;

said first conveyor having a power take off;

means connected to said power take off for driving said second conveyor; and means connected to said power take off for driving said diverter means; wherein said diverter driving means includes a common drive roller and a plurality of diverter drive belts, and said diverter includes at least two sets of two flat diverter belts, one diverter drive belt operatively connected to drive two of said flat diverter belts.

16. A diverter apparatus for diverting conveyed articles from a first conveying direction toward a second direction, said apparatus including:

a plurality of pivotable carriages;

at least two flat diverter belts mounted on each carriage, each belt defining an elongated diverter run;

means for driving said diverter belts;

means for selectively pivoting said carriages to align said diverter runs with said first conveying direction and selectively in another direction to divert articles engaging said diverter belts from said first direction.

17. Diverter apparatus as in claim 16 wherein said diverter belt drive means includes a separate carriage drive belt.

18. A diverter apparatus for use in diverting articles conveyed in one direction toward another direction, said diverter including:

an elongated pivotable carriage having an upstream end and a downstream end;

at least two axles mounted on said carriage, one upstream of the other;

two pulleys mounted on each axle, one pulley on one axle aligned with one pulley on another axle;

a flat diverter belt wound about each aligned set of pulleys, each belt defining an upper diverter run; and a drive pulley mounted on one axle for driving both said diverter belts.

19. Diverter apparatus as in claim 18 further including respective axle journal means mounted on said carriage, and said carriage including recess means for receiving one said respective journal means from one direction and another respective journal means from another direction, said mounted journal means holding said axles apart a predetermined distance.

20. Diverter apparatus as in claim 19 wherein said drive pulley is mounted on one of said axles disposed upstream from the other axle.

21. Diverter apparatus as in claim 20 wherein said axle journal means for said upstream axle is slidable into position on said carriage in a direction which is perpendicular to the elongated extension of said carriage between its upstream and downstream ends.

22. Diverter apparatus as in claim 21 wherein said axle journal means for said downstream axle is slidable into position on said carriage in a direction parallel to said elongated extensions of said carriage.

23. Conveying apparatus including a diverter for diverting articles being conveyed in an initial direction toward at least a second direction, said diverter being disposed in a first conveyor path defined by a first conveyor, said path extending along said initial direction and said diverter comprising:
   a plurality of diverter carriages;
   two diverter belts on each carriage; the belts each defining an upper diverter run;
   means for driving said diverter belts to convey articles therein in a direction along said upper diverter run; and
   means for selectively pivoting said carriages between at least two positions such that said diverter run in one position of said carriages is substantially aligned with said initial direction and said diverter run in at least a second position of said carriages is aligned in another direction, at an angle to said first direction, to divert articles toward said second direction.

24. Apparatus as in claim 23 wherein said carriages are pivotably mounted on a support, and wherein said carriages are vertically adjustable with respect to said support.

25. Apparatus as in claim 23 wherein said carriages are pivotally mounted on a support, and wherein said support is vertically adjustable to adjust the vertical orientation of said diverter belts with respect to articles in said path.

26. Apparatus as in claim 23 including means for adjusting the angle of said diverter belts with respect to the horizontal.

27. Apparatus as in claim 26 wherein said means are operable for raising a downstream end of said diverter belts above an upstream end thereof to incline said upper diverter run.

28. Apparatus as in claim 23 wherein said carriages are mounted on a support by pivot means including a bearing having a shaft secured to said support.

29. Apparatus as in claim 28 wherein said support includes an adjustable sleeve means for releasably holding said shaft.

30. Apparatus as in claim 29 further including jack screw means for adjusting the vertical position of said shaft.

31. Apparatus as in claim 30 including a bearing block secured to said carriage for receiving a portion of said bearing.

32. Apparatus as in claim 31 including cap means on said bearing block for supporting said carriage on said bearing and for facilitating removal of said carriage from said bearing.

33. Apparatus as in claim 23, including:
   a drive roller;
   a pulley on each said carriage for driving said diverter belts thereof;
   a jack spool means associated with each carriage;
   first belt means operably connecting said jack spool means with a pulley on a respective carriage; and
   second belt means operably connecting said drive roller to each said jack spool for driving said jack spool and said pulley.

34. Apparatus as in claim 33 wherein said jack spool means includes a first circumferential groove for receiving said second belt means, and a second wider groove for receiving said first belt means.

35. Apparatus as in claim 34 further including means adjustably mounting said jack spool means.

36. Conveying apparatus as in claim 23 including two sets of diverter carriages, one of said sets disposed immediately downstream of another said set.

37. Conveying apparatus as in claim 36 wherein said sets are pivotable in opposite directions.

* * * * *

UNITED STATES PATENT AND TRADEMARK OFFICE
CERTIFICATE OF CORRECTION

PATENT NO. : 5,117,961
DATED : June 2, 1992
INVENTOR(S) : Robert J. Nicholson

It is certified that error appears in the above-indentified patent and that said Letters Patent is hereby corrected as shown below:

Column 4, line 51, "Suchg" should be -- Such --.

Column 6, line 26, "IO" should be -- 10 --.

Column 7, line 37, "II" should be -- 11 --.

Column 9, line 55, "7" should be -- 27 --.

Column 10, line 14, "139( 140" should be -- 139, 140 --.

Column 11, line 20, after "can be" insert the following: -- controlled through any suitable means, which do not --.

Column 15, line 42, "carriages" should be -- carriage --.

Signed and Sealed this

Eighth Day of November, 1994

Attest:

BRUCE LEHMAN

Attesting Officer

Commissioner of Patents and Trademarks